(12) United States Patent
Gutel et al.

(10) Patent No.: US 12,040,489 B2
(45) Date of Patent: Jul. 16, 2024

(54) USE OF A BATTERY WITH POLYVIOLOGEN ACTIVE MATERIAL

(71) Applicants: COMMISSARIAT A L'ENERGIE ATOMIQUE ET AUX ENERGIES ALTERNATIVES, Paris (FR); NANTES UNIVERSITE, Nantes (FR); CENTRE NATIONAL DE LA RECHERCHE SCIENTIFIQUE, Paris (FR)

(72) Inventors: Thibaut Gutel, Grenoble (FR); Lionel Dubois, Grenoble (FR); Vincent Cadiou, Saint-Malo (FR); Philippe Poizot, Treillieres (FR)

(73) Assignees: COMMISSARIAT A L'ENERGIE ATOMIQUE ET AUX ENERGIES ALTERNATIVES, Paris (FR); NANTES UNIVERSITE, Nantes (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 477 days.

(21) Appl. No.: 16/678,884

(22) Filed: Nov. 8, 2019

(65) Prior Publication Data
US 2020/0152984 A1    May 14, 2020

(30) Foreign Application Priority Data
Nov. 9, 2018   (FR) ...................................... 1860398

(51) Int. Cl.
*H01M 4/60*      (2006.01)
*H01M 4/58*      (2010.01)
(Continued)

(52) U.S. Cl.
CPC ......... *H01M 4/606* (2013.01); *H01M 4/5825* (2013.01); *H01M 10/0525* (2013.01); *H01M 10/054* (2013.01); *H01M 10/44* (2013.01)

(58) Field of Classification Search
None
See application file for complete search history.

(56) References Cited

U.S. PATENT DOCUMENTS 5,232,574 A     8/1993  Saika et al.
5,883,220 A *   3/1999  Armand ........... C08G 65/33317
                                                528/322
(Continued)

FOREIGN PATENT DOCUMENTS

EP        0476338 A2 *  3/1992   ............. C08G 61/12

OTHER PUBLICATIONS

Hu et al., "Distonic Biradical Anions. Synthesis and Characterization of the 3,5-Dehydrophenyl and 1,3,5-Trimethylenebenzene Negative Ions", 1996, J. Am. Chem. Soc., 118, pp. 5816-5817.*
(Continued)

*Primary Examiner* — Amanda C. Walke
(74) *Attorney, Agent, or Firm* — ArentFox Schiff LLP

(57) ABSTRACT

The present invention relates to a method for using a battery which has an electrode that functions according to a mechanism of complexation of anions and within which the electrode active material is a polyviologen, characterized in that said polyviologen is a material that is insoluble in the electrolyte of said battery and in that the electrochemical conditions for use of said battery are adjusted so that its charge/discharge cycling process is established on the basis of the 1-electron redox reaction between the 1-electron oxidized form of the viologen units of said polyviologen, termed cation radical, and their totally reduced form, termed neutral form of the polyviologen.

10 Claims, 6 Drawing Sheets

(51) Int. Cl.
    *H01M 10/0525*   (2010.01)
    *H01M 10/054*    (2010.01)
    *H01M 10/44*     (2006.01)

(56) References Cited

U.S. PATENT DOCUMENTS

| | | | |
|---|---|---|---|
| 2009/0137807 A1 | 5/2009 | Kwon et al. | |
| 2022/0126321 A1* | 4/2022 | Soliman | B81B 3/0021 |
| 2023/0024358 A1* | 1/2023 | Kim | H01M 8/188 |

OTHER PUBLICATIONS

Deunf et al., "Solvation, exchange and electrochemical intercalation properties of disodium 2,5-(dianilino)terephthalate", Jun. 30, 2016, CrystEngComm, 18, pp. 6076-6082.*

Beh et al., "A Neutral pH Aqueous Organic-Organometallic Redox Flow Battery with Extremely High Capacity Retention", Feb. 7, 2017.

DeBruler et al., "Designer Two-Electron Storage Viologen Anolyte Materials for Neutral Aqueous Organic Redox Flow Batteries", Chem, Dec. 14, 2017.

French Preliminary Search Report issued in related French Patent Application No. 1860398 dated Oct. 3, 2019.

Hagemann et al., "An aqueous all-organic redox-flow battery employing a (2,2,6,6-tetramethylpiperidin-1-yl)oxyl-containing polymer as catholyte and dimethyl viologen dichloride as anolyte", Journal of Power Sources, Sep. 2, 2017.

Hu et al., "A Long Cycling Aqueous Organic Redox Flow Battery (AORFB) towards Sustainable and Safe Energy Storage", J. Am. Chem. Soc., Dec. 14, 2016.

Sano et al., "Polyviologen Hydrogel with High-Rate Capability for Anodes toward an Aqueous Electrolyte-Type and Organic-Based Rechargeable Device", Applied Materials & Interfaces, Jan. 24, 2013.

Yao et al., "Molecular ion battery: a rechargeable system without using any elemental ions as a charge carrier", Scientific Reports, Jun. 4, 2015.

* cited by examiner

USE OF A BATTERY WITH POLYVIOLOGEN ACTIVE MATERIAL

CROSS-REFERENCE TO RELATED APPLICATIONS

This application claims priority to French Patent Application No. 18 60398, filed on Nov. 9, 2018. The disclosure of the priority application is incorporated in its entirety herein by reference.

FIELD OF THE INVENTION

The present invention relates to the field of batteries that are most particularly useful for electrochemical storage of energy.

BACKGROUND AND SUMMARY

At the current time, research in the energy field is directed toward the exploitation of energy sources that are "greener" and more long lasting since they are renewable, such as solar energy and geothermal energy and also hydroelectricity and wind power.

However, the exploitation of these energy sources exacerbates the problem of energy storage. In point of fact, the usual batteries do not prove to be totally satisfactory in this regard. Batteries comprising materials of organic electrodes have thus been developed. As representatives of the constituent materials of these organic electrodes, mention may in particular be made of quinones and N,N-disubstituted bipyridine derivatives, also called viologens. The electrical energy is generated by delocalization of the pi electrons of these organic materials.

Among these materials, polyviologens prove to be most particularly valuable.

Thus, Yao et al. (Scientific Reports, 5,10962, 2015; DOI: 10.1038/srep10962) describe the use of linear polyviologens as active material of a "molecular-ion" battery negative electrode. This polyviologen-based electrode, combined with a polyvinylcarbazole-based positive electrode is then used to assemble an "anionic" battery, that is to say a battery in which it is the $PF_6^-$ anion which shuttles between the two electrodes during the charge/discharge. The ionic battery is used at cycles of −0.7 and −1.2 V vs $Ag^+$/Ag according to the following 2-electron redox reaction:

combined with a polynitroxide-based positive electrode. The electrochemical study of the compounds obtained is also based on a 2-electron redox reaction at −0.48 V and −0.86 V vs $Ag^+$/Ag with an initial capacity of 174 mAh/g (i.e. 95% of the theoretical capacity).

These viologen derivatives have also been considered as electroactive compounds of an anolyte (negative electrolyte) of a redox flow battery, but in soluble versions [Hagemann, J. Power Sources, 2018, 378, 546-554; DeBruler, Chem, 2017, 3, 961-978; Beh, ACS Energy Lett., 2017; 639-644; Hu, J. Am. Chem. Soc., 2017, 139, 1207-1214].

Nevertheless, the use of polyviologens as materials of battery electrodes comes up against problems of rapid performance quality loss and thus very low battery life which are attributed to dissolution of the active material in the electrolyte during the cycling. This results in an instability of the charge/discharge behavior.

However, a user of a device electrically powered by a rechargeable battery expects the reversible capacity of the battery not to decrease, or not to decrease very much, as the number of charge/discharge cycles increases.

There is thus a need for a rechargeable battery using an active material of polyviologen type, the performance qualities of which are stabilized during its cycling process.

The invention is specifically directed toward satisfying this need.

Against all expectations, the inventors have noted that it is possible to guarantee the performance qualities of a battery comprising active material of polyviologen type with the proviso of taking into consideration specific electrochemical conditions for its use.

More specifically, the present invention is directed principally toward a method for using a battery, which has an electrode that operates according to a mechanism of complexation of anions and within which the electrode active material is a polyviologen, characterized in that said polyviologen is a material that is insoluble in the electrolyte of said battery and in that the electrochemical conditions for use of said battery are adjusted so that its charge/discharge cycling process is established on the basis of the 1-electron redox reaction between the 1-electron oxidized form of the viologen units of said polyviologen, termed cation radical, and their totally reduced form, termed neutral form of polyviologen.

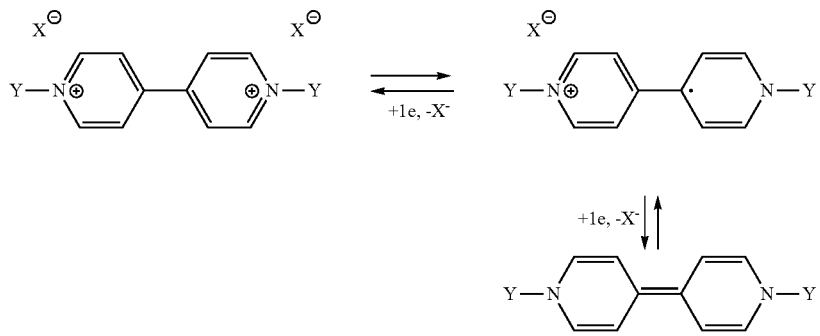

Unfortunately, a rapid drop in performance qualities during such cycling is noted.

Sano et al. (ACS Appl. Interfaces, 2013, 5, 1355-1361) also describe the use of crosslinked polyviologen films as active material of a negative electrode of anionic batteries The charge/discharge cycling process is initiated with a polyviologen in neutral form or in cation radical form.

According to the invention, the electrochemical conditions for use of said battery are adjusted so that the two-electron oxidized form of the viologen units of the polyviologen material does not participate in a charge/discharge cycle. In other words, the two-electron oxidized form of the viologen units if reduced is not regenerated.

In particular, the oxidized forms of said polyviologen are associated with at least one counterion of organic anion type chosen from [N(SO$_2$CF$_3$)$_2$]$^-$ (=TFSI$^-$), [N(SO$_2$F)$_2$]$^-$ (=FSI$^-$), 4,5-dicyano-2-(trifluoromethyl)imidazole (=TDI), RCOO$^-$ and HCOO$^-$, or inorganic anion type such as PF$_6^-$, BF$_4^-$, ClO$_4^-$, F$^-$, Cl$^-$, Br$^-$, I$^-$, NO$_3^-$ and HSO$_4^-$.

The conditions for electrochemical use that are proposed in the invention prove to be most particularly efficient.

First of all, they make it possible to efficiently limit the electrochemical degradation of the polyviologen material. Thus, as opposed to the two-electron reduction/oxidation reaction which results in rapid performance quality losses during cycling, the selection of a potential range targeting cycling on the basis of the reaction with a single electron between the totally reduced polyviologen and its form in which the monomers are monooxidized makes it possible to dispense with this unwanted phenomenon.

Consequently, the battery has a stabilized charge/discharge behavior. For the purposes of the invention, a stabilized charge/discharge behavior is intended to describe the fact that the reversible capacity of the battery virtually does not decrease as the number of charge/discharge cycles increases. This advantage is in particular illustrated in the examples hereinafter.

FIGURES

Figure 1A:
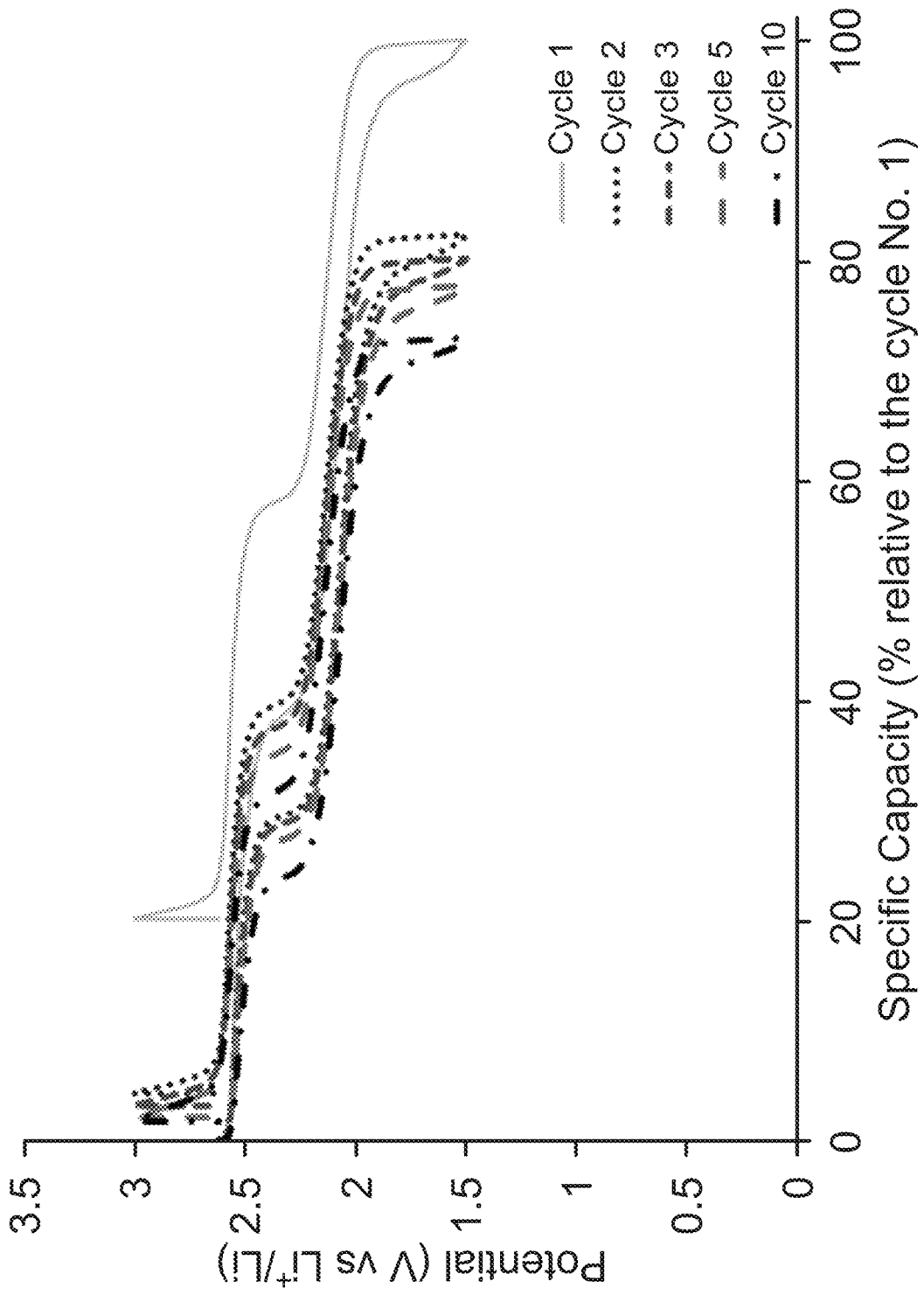
FIG. 1a illustrates the voltammetric cycle observed for the described device in Example 4 in a potential range from 3.00 V to 1.50 V.

The expressions "of between . . . and . . ." and "ranging from . . . to . . ." should be understood as limits included, unless otherwise specified.

DETAILED DESCRIPTION OF THE INVENTION

As mentioned above, polyviologens are materials that are already used as anode electrode active materials.

For the purposes of the invention, unless specified, the term "polyviologen" covers all of the oxidized and reduced forms of polyviologen.

For the purposes of the invention, the term "active material" is intended to denote the electroactive material at the electrode.

The polyviologens that are suitable for the invention as electrode active material are formed of monomers comprising at least one neutral viologen unit of general formula (Ia) or one oxidized viologen unit of general formula (Ib) or (Ic)

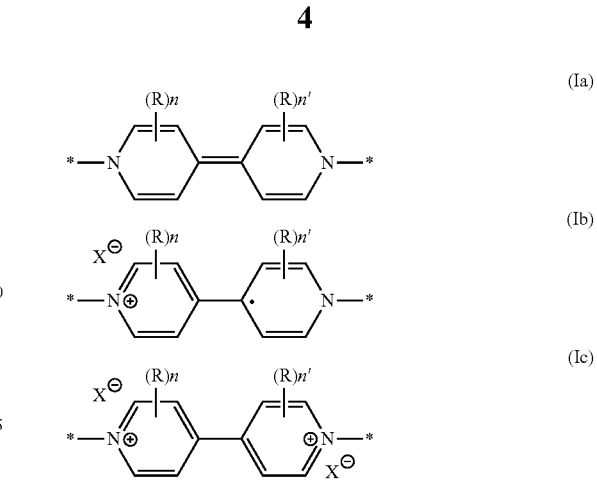

in which:
the R groups, which may be identical or different, represent a hydrogen atom, a C$_2$ to C$_{50}$ linear alkyl, where appropriate substituted with at least one carboxylic, carboxylate, sulfonic, sulfonate, phosphonic, phosphonate or amine function, at least one halogen atom, or at least one hydroxyl or aldehyde group, or even interrupted with a ketone unit;
n and n' are, independently of one another, equal to 0 or to an integer between 1 and 50, and
the X radicals, which may be identical or different and are preferably identical, are respectively an organic anion chosen from [N(SO$_2$CF$_3$)$_2$]$^-$ (=TFSI$^-$), [N(SO$_2$F)$_2$]$^-$ (=FSI$^-$), 4,5-dicyano-2-(trifluoromethyl)imidazole (=TDI), RCOO$^-$ and HCOO$^-$, or an inorganic anion such as PF$_6^-$, BF$_4^-$, ClO$_4^-$, F$^-$, Cl$^-$, Br$^-$, I$^-$, NO$_3^-$ and HSO$_4^-$.

As previously pointed out, the polyviologen active material is insoluble in the electrolyte that is associated with it in the battery containing it.

For the purposes of the invention, the term "insoluble" is intended to describe the fact that dissolution of this polyviologen in the electrolyte during the cycling process is not noted.

The chemical nature of the counterions associated with the oxidized forms of polyviologen and in particular represented by the symbol X in the formulae Ib, Ic and those detailed hereinafter, is precisely advantageous for conditioning the insolubility of the polyviologen material in the electrolyte jointly considered for the battery.

Preferably, the constituent monomers of said polyviologen are identical. In other words, they have viologen units of the same chemical nature and same oxidation state.

The polyviologen material can thus be a linear polyviologen, a crosslinked polyviologen or a mixture thereof.

In particular, the electrode material of said battery is at the initiation of the charge/discharge cycling process, that is to say a polyviologen of which the viologen units are non-charged, as in particular illustrated in Figure (Ia) or a polyviologen in cation radical form, that is to say it is a polyviologen of which the viologen units are in a monooxidized form as in particular illustrated in Figure (Ib).

According to one implementation variant, the neutral form or the cation radical form of the polyviologen is generated beforehand in situ, that is to say within the battery, from a polyviologen electrode active material of which the viologen units are in their two-electron oxidized form as in particular illustrated in Figure (Ic), by total or partial reduction of said viologen units.

According to this variant, the battery dedicated for use according to the invention thus initially contains, as electrode active material, a polyviologen material in two-electron oxidized form. This form can be reduced in situ by applying a negative current until the voltage of 1.5 V required for complete reduction of said polyviologen is reached. This variant is in particular illustrated in Example 4 and 5.

According to another implementation variant, the battery dedicated for use according to the invention contains, as electrode active material, a polyviologen material in cation radical form. More specifically, these viologen units are of formula (Ib). Such a material has generally been generated beforehand in an electrochemical device distinct from said battery. This variant is in particular illustrated in Example 6.

As detailed above, the charge/discharge cycle in accordance with the invention takes place between the neutral form (Ia) and the cation radical form (Ib).

The form (Ic) if present before the cycle in accordance with the invention, is essentially subjected to a non-reversible reduction in order to generate the neutral form (Ia) or (Ib). The electrochemical conditions for use of said battery are adjusted so that the two-electron oxidized form of the viologen units of the polyviologen material does not participate in a charge/discharge cycle. It is not regenerated.

A polyviologen according to the invention can have a molar mass of from 500 to 1 million g/mol.

In particular, the battery comprises, as electrode active material, a polyviologen material of formula (II)

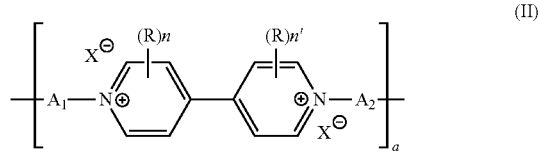

in its oxidized, in particular cation radical, or reduced forms, and wherein
the units $A_1$ and $A_2$, which may be identical or different, independently of one another represent a covalent bond or represent a $C_1$ to $C_{50}$ alkyl chain, where appropriate substituted with at least one carboxylic, carboxylate, sulfonic, sulfonate, phosphonic, phosphonate or amine function, at least one halogen atom, at least one hydroxyl or aldehyde group, or even interrupted with a ketone radical or a unit of formula —Ar($A_3$)- with Ar being a trivalent or tetravalent $C_6$ to $C_{10}$ arylene unit, preferably a $C_6H_3$ phenylene, and $A_3$ a $C_1$ to $C_{20}$ alkyl chain covalently bonded to the Ar unit and to a viologen derivative of formula (II), and
R, n, n' and X are as defined in formula (Ib) or (Ic) and a is an integer ranging from 1 to 10 million.

According to a first embodiment, the battery comprises, as electrode active material, a linear polyviologen material, in particular of general formula (III)

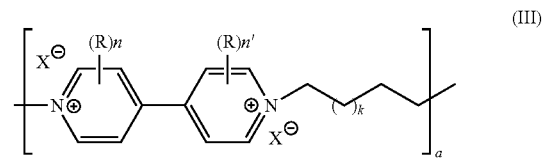

in its oxidized or reduced forms and wherein R, n, n' and $X^-$, if present, have the same meanings as above, a is an integer ranging from 1 to 10 million and k is an integer ranging from 1 to 50.

According to a second embodiment, the battery comprises, as electrode active material, a crosslinked polyviologen material, in particular of general formula (IV):

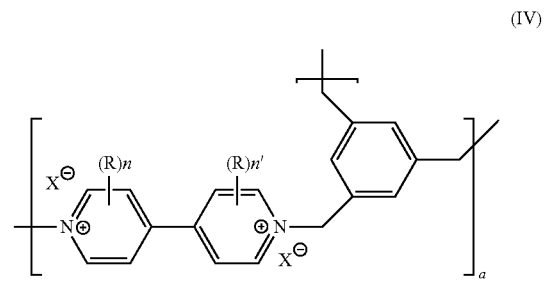

in its oxidized or reduced forms and wherein R, n, n', a and $X^-$, if present, have the same meanings as above.

The polyviologens of formulae II to IV wherein R═H, n=n'=1, and a is an integer greater than 5 and less than 100 are in particular suitable for the invention.

By way of representation of polyviologens that are suitable for the invention as electrode active material, mention may in particular be made of poly(1,1'-butyl-4,4'-bipyridinium dihexafluorophosphate) (often abbreviated to PBPy) and poly(1,1,1-trimethylbenzyl-4,4'-bipyridinium dihexafluorophosphate).

The polyviologens suitable for the invention as electrode active material can be prepared electrochemically as described in the article Sano et al. (ACS Appl. Interfaces, 2013, 5, 1355-1361) or chemically as described in the article Yao et al. (Scientific Reports, 5,10962, 2015; DOI: 10.1038/srep10962).

In the context of the present invention, the choice of chemical polymerization is preferred since it makes it possible to easily prepare the material in a large amount (scale of one gram to one kg) and to envisage the large-scale formulation of electrodes which are not only composite (composed of active material, electron conductor, binder), but also have large thicknesses (>10 μm) which thus have large surface capacities (of about one mAh/cm²).

Regardless of the synthesis route considered, a linear or crosslinked polyviologen is prepared by quaternarization of bipyridine with a haloalkane that is difunctional, trifunctional or tetrafunctional (or even more in the case of branched alkane chains), then metathesis of anions. This type of reaction is in particular detailed in the publication Yao et al. (Scientific Reports, 5,10962, 2015; DOI: 10.1038/srep10962).

A polyviologen material is able to exhibit the following 2-electron redox reaction:

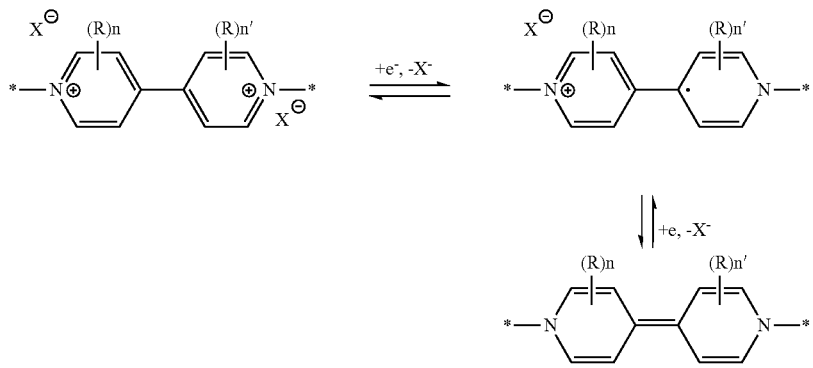

As stated above, in the prior art batteries, the charge/discharge cycle is based only on this 2-electron redox reaction which unfortunately cannot be stabilized in terms of performance qualities. This is in particular illustrated in FIGS. 1a and 2a. A reversible capacity which decreases with an increase in the number of charge/discharge cycles is observed. The method according to the present invention has precisely the advantage of dispensing with this stabilization fault.

In the method of the invention, only the second electrochemical process, namely that involving the electrochemical conversion of the mono-oxidized viologen monomers to viologen monomers which are totally reduced/neutral and vice versa, is considered.

The electrochemical process involving the electrochemical conversion of the deoxidized monomeric form, if present, into its reduced monomeric form does not participate in the cycling process according to the invention, which is limited between the reduced form of polyviologen and its mono-oxidized form.

In various embodiments of the invention, the materials described above can be used in batteries termed lithium, sodium, potassium, magnesium or calcium batteries, sodium-sulfur batteries (termed "NaS" batteries) or else batteries in dual-ion or anion-ion configuration.

In one embodiment of the invention, a battery may be obtained by combining, with an electrode comprising polyviologen material as described above, a metal counterelectrode.

For example, such a metal electrode may be a lithium, sodium, potassium, magnesium or calcium electrode.

As positive electrodes of lithium batteries, mention may in particular be made of phosphate electrodes such as $LiFePO_4$, $LiMnPO_4$ or $LiCoPO_4$, "NMC"-type or "NCA"-type electrodes, in particular in the form of lamellar oxides corresponding to the general formula $LiNi_xMn_yCo_zAl_aO_2$ with $x+y+z=1$, spinel oxide electrodes such as $LiMn_2O_4$ or $LiMn_{1.5}Ni_{0.5}O_4$.

As positive electrodes of sodium batteries, mention may in particular be made of electrodes of "NVPF" types, of formula $Na_3V_2(PO_4)_2F_3$, or else electrodes of "NMC" types, in particular in the form of lamellar oxides corresponding to the general formula $NaNi_xMn_yCo_zO_2$ with $x+y+z=1$.

As positive electrodes of organic anion-ion batteries, mention may in particular be made of electrodes composed of radicals of nitroxides, of thioethers, or of aromatic amines or conductive polymers which are doped according to a "p"-type mechanism.

With regard to the electrolytes, mention may in particular be made of aqueous solutions or mixtures of solvents of alkyl carbonate, ether, ester, nitrile, etc., type, comprising a salt of lithium, of sodium, of potassium, of calcium or of magnesium, but also of ammoniums, of phosphonium, of sulfonium associated with organic anions chosen from $[N(SO_2CF_3)_2]^-$ (=TFSI$^-$), $[N(SO_2F)_2]^-$ (=FSI$^-$), 4,5-dicyano-2-(trifluoromethyl)imidazole (=TDI), $RCOO^-$ and $HCOO^-$ or inorganic anions chosen from $PF_6^-$, $BF_4^-$, $ClO_4^-$, $Cl^-$, $F^-$, $Br^-$, $I^-$ and $NO_3^-$.

According to one embodiment, said battery comprises, as counterelectrode, a lithium metal electrode and its electrochemical conditions for use for its charge/discharge cycling process are obtained for a potential scan limited between 1.5 V and 2.25 V vs Li$^+$/Li. In other words, the electrochemical conditions for use of such a battery, according to the invention, are obtained for a voltage between 1.5 V and 2.25 V.

According to another embodiment, said battery comprises, as counterelectrode, dilithium 2,5-dianilinoterephthalate and its electrochemical conditions for use for its charge/discharge cycling process are obtained for a voltage scan limited between 0.2 V and 1.2 V. In other words, the electrochemical conditions for use of such a battery, according to the invention, are obtained for a voltage of between 0.2 V and 1.2 V.

The examples and figures, detailed below, are presented for illustrative purposes and do not limit the field of the invention.

Example 1

Synthesis and characterization of a linear polyviologen according to the following synthesis scheme:
a) Quaternization of 4,4'-Bipyridine

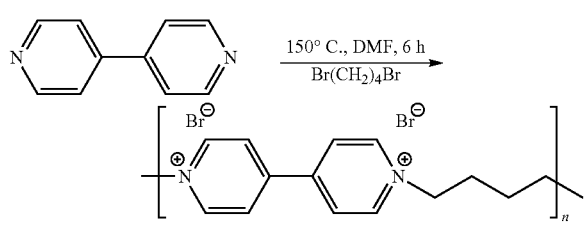

1 g of 4,4'-bipyridine is dissolved in 6 ml of anhydrous dimethylformamide, to which 0.76 ml of dibromobutane is added. The solution is refluxed for 6 hours at 150° C. so as to form a yellow suspension. The solid is filtered off, then washed with 3 times 50 ml of ethyl acetate, before being dried at 80° C. The yield of this reaction is 96%, i.e. 2.28 g of polymer obtained.

b) Ion Exchange Reaction of the Brominated Polyviologen:

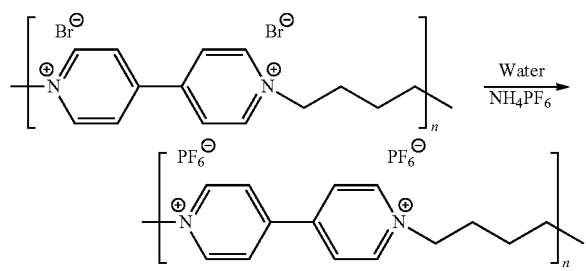

In a second step, 1 g of this product is dissolved in 10 ml of distilled water, to which a solution of 5 g of $NH_4PF_6$ in 7.5 mL of water is added dropwise. After mixing for 1 h, the precipitate obtained is filtered off and washed with diethyl ether, before being dried at 80° C. 0.315 g of violet powder is obtained, i.e. a yield of 82%.

Example 2

Synthesis and characterization of a crosslinked polyviologen according to the following synthesis scheme:

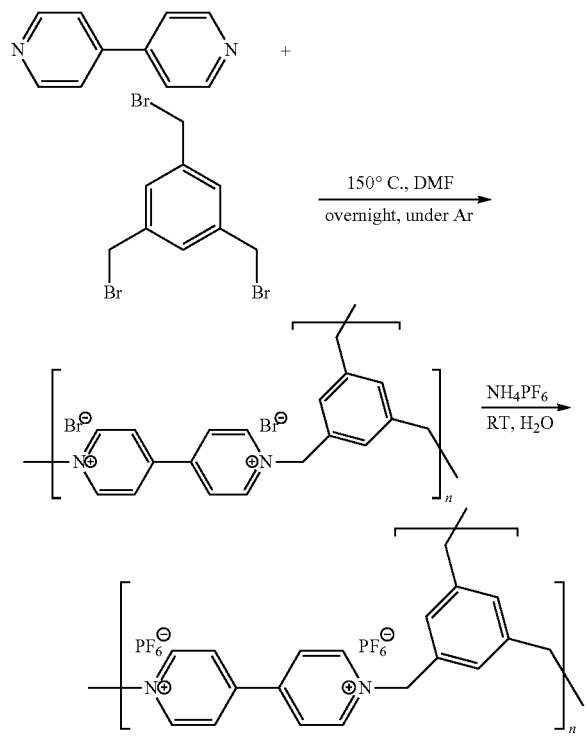

509 mg of 4,4'-bipyridine are dissolved in 10 ml of anhydrous dimethylformamide, to which 773 mg of 1,3,5-tris(bromomethylbenzene) are added. The solution is refluxed overnight at 150° C. so as to form a yellow suspension. The solid is filtered off, then washed with 3 times 50 ml of ethyl acetate, before being dried at 80° C. under vacuum. The yield of this reaction is 85%, i.e. 1.09 g of polymer obtained. This compound is insoluble in all the solvents tested (acetone, acetonitrile, diethyl ether, N,N-dimethylformamide, ethanol, water, propylene carbonate, tetrahydrofuran).

In a second step, 300 mg of this product are dispersed in 20 ml of distilled water, to which a solution of 2 g of $NH_4PF_6$ in 8 ml of water is added dropwise. After mixing for 1 h, the precipitate obtained is filtered off and washed with water, before being dried at 80° C. 0.96 g of violet powder is obtained, i.e. a yield of 82%.

Example 3

Production of Polyviologen Electrodes

The various polyviologens (PVs) synthesized according to Examples 1 and 2 are tested in the following way:

Each compound is dispersed in N-methylpyrrolidinone, MP, with Super P (SP) carbon and polyvinylidene fluoride (PVdF) in a proportion of 40%/40% SP/20% PVdF (by weight), then the mixture thus formed is coated onto an aluminum strip.

After drying at 55° C. overnight, electrodes are cut, calendered and, finally, dried under vacuum for 48 h.

Example 4

Illustration of a Method According to the Invention

The electrodes prepared in Example 3 are assembled in a glovebox using lithium metal as counterelectrode, and a mixture of carbonates (EC/DMC mixture) and of $LiPF_6$ salts as electrolyte.

The electrochemical tests are carried out by galvanostatic cycling with a C/10 regime. After complete reduction of the material to 1.50 V vs Lit/Li, the potential limits were fixed at [1.50 V; 2.25 V] according to the invention or [3.00 V; 1.50 V] not in accordance with the invention.

Figure 1B:
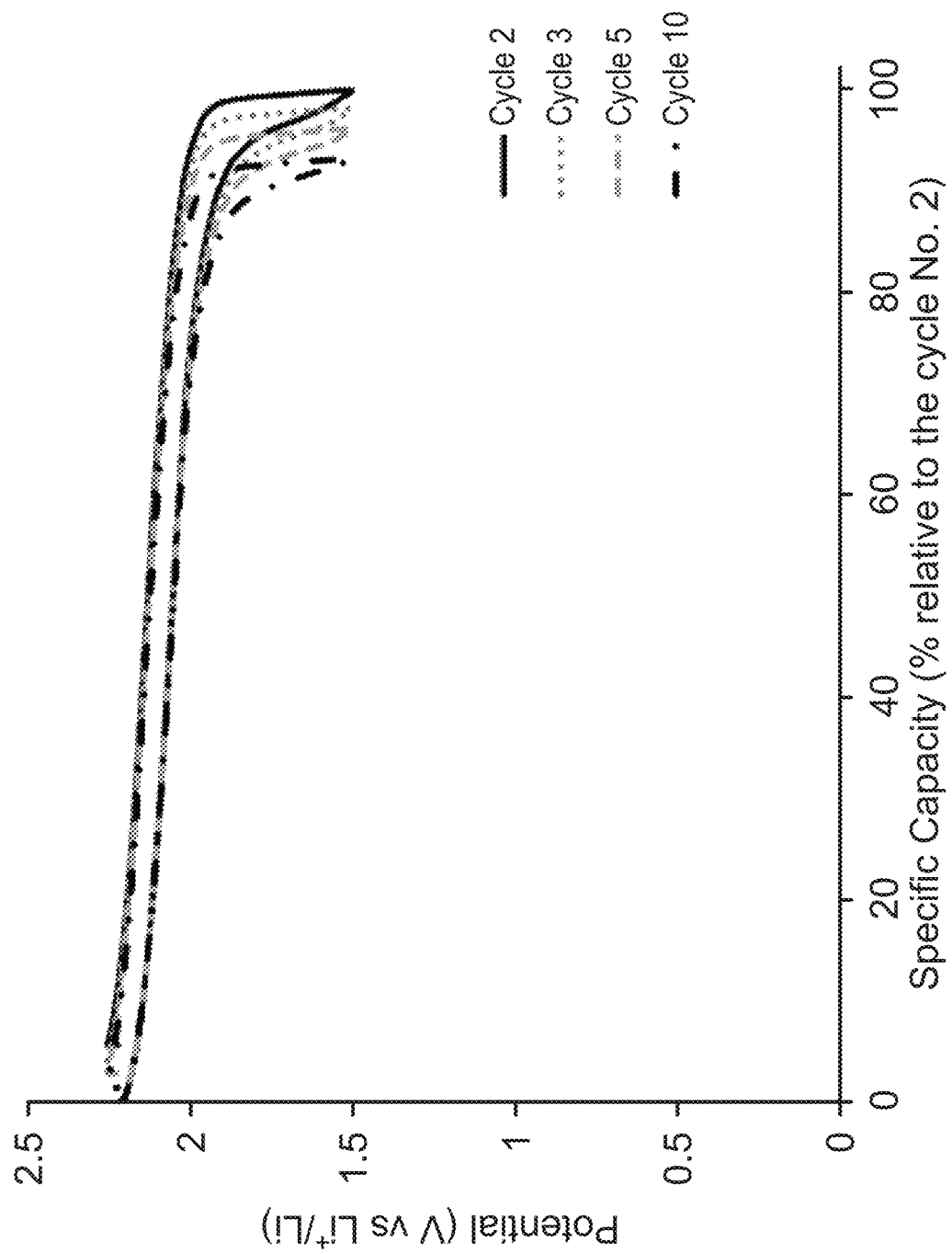
FIG. 1b illustrates the voltammetric cycle observed for the device described in Example 4 in a potential range from 2.25 V to 1.50 V.

As illustrated in FIG. 1 for the product prepared according to Example 2, the galvanostatic cycle observed for a potential range from 3.00 V to 1.50 V (FIG. 1a) accounts, as expected, for a 2-electron redox reaction. On the other hand, the galvanostatic cycle observed for a potential range from 2.25 V to 1.50 V (FIG. 1b) accounts for a single-electron redox reaction.

FIG. 2 illustrate the change in the specific capacity of the battery as a function of the number of cycles according to these two conditions of use.

Figure 2A:
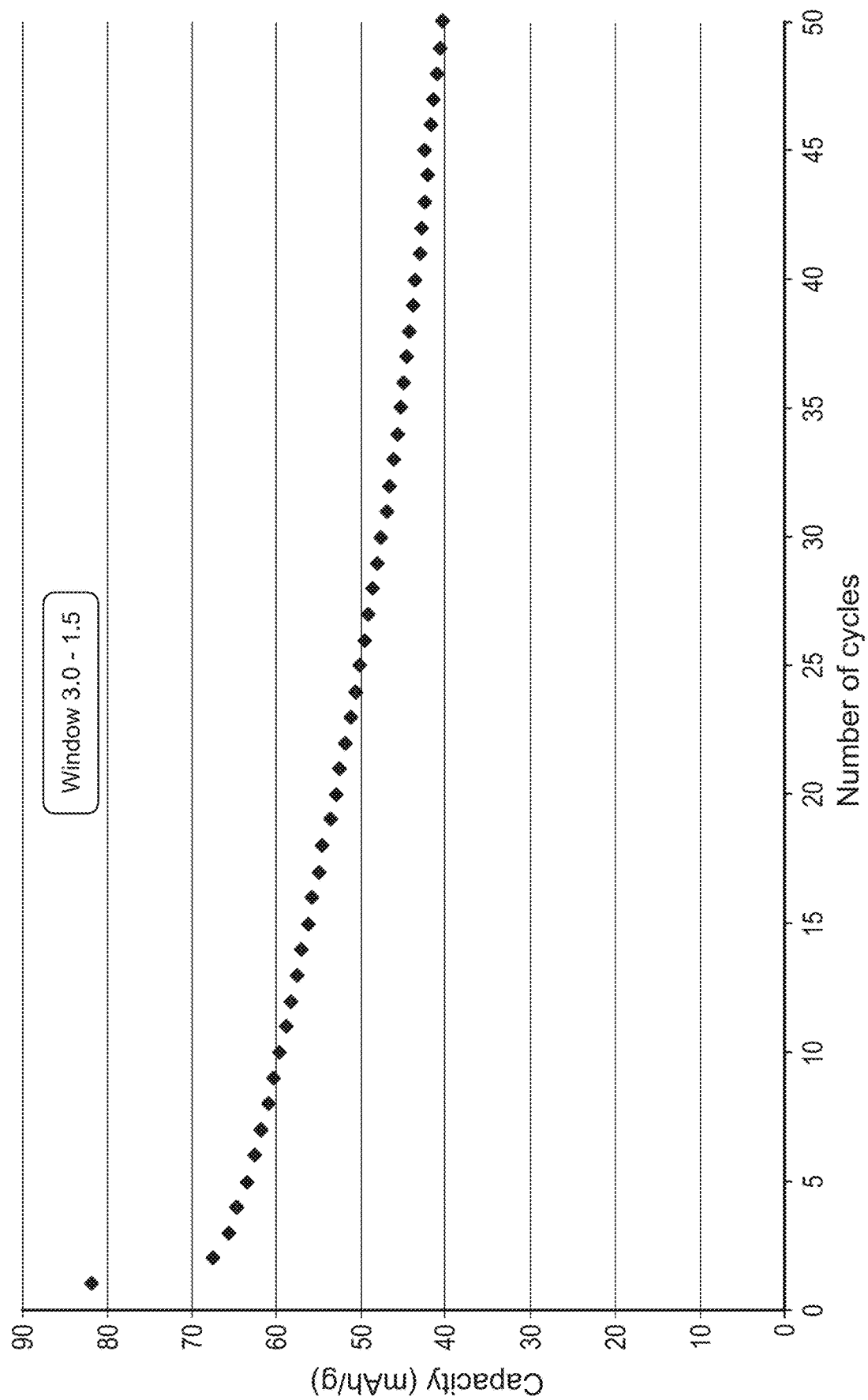
FIG. 2a illustrates the change in the capacity as a function of the number of cycles for the device described in Example 4 used in a potential range from 3.00 V to 1.50 V.
Figure 2B:
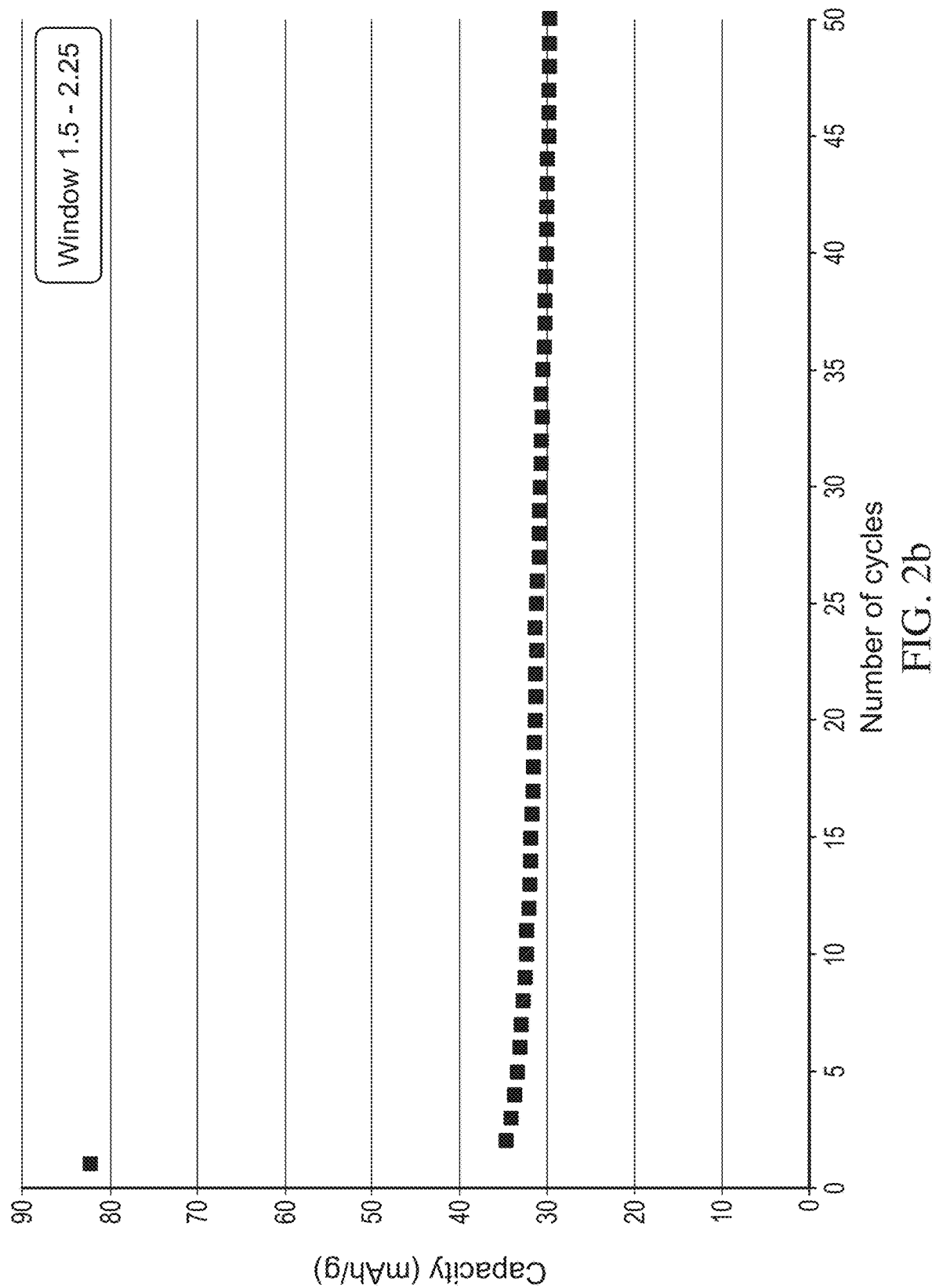
FIG. 2b illustrates the change in the capacity as a function of the number of cycles for the device described in Example 4 used in a potential range from 2.25 V to 1.50 V.

As demonstrated by FIG. 2b, only the use of the battery according to the invention makes it possible to stabilize its specific capacity.

FIG. 2a clearly shows that the use of a limited potential range from 3.00 to 1.50 V is adjusted for a targeted 2-electron redox reaction and leads to a decrease in the performance qualities of this battery.

Example 5

Illustration of a Method According to the Invention

The synthesis method detailed in Example 1 was reproduced taking into consideration, as counterions, the $BF_4^-$, $TFSI^-$, $ClO_4^-$ and $NO_3^-$ ions using, respectively, the $NH_4BF_4$, the LiTFSI, the $LiClO_4$ and $LiNO_3$ salts.

The corresponding polyviologens were used to develop electrodes according to the method detailed in Example 3 and the latter were tested in a battery under the conditions detailed in Example 4.

Figure 3:
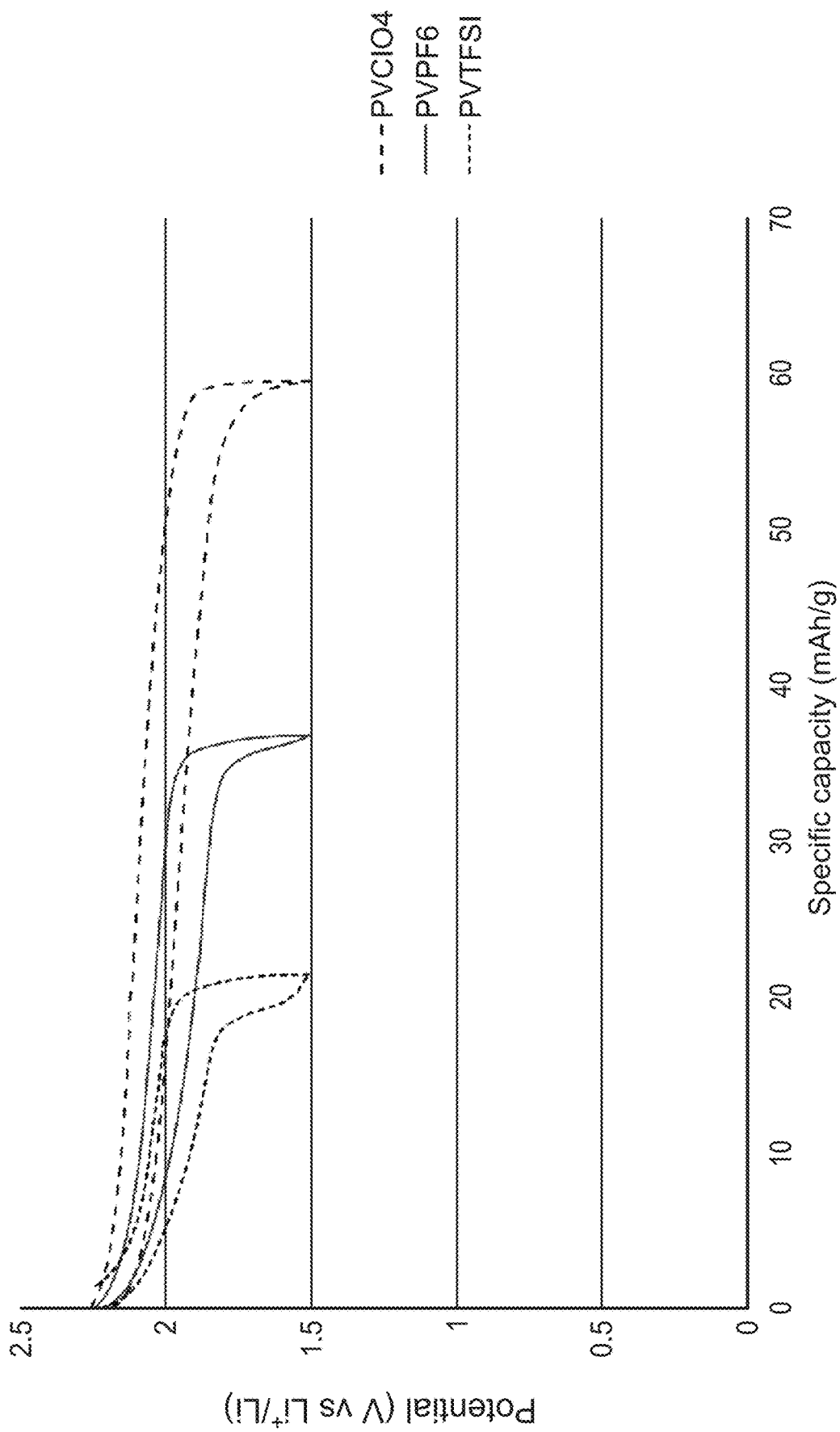
FIG. 3 illustrates the potential-capacity profile of the second cycle for electrodes comprising various compounds as a function of the counterion chosen as specified in Example 5.

FIG. 3 clearly shows that all of the batteries tested under the conditions required according to the invention show the expected properties.

Example 6

Illustrations of a Method According to the Invention

After a complete reduction of the crosslinked polyviologen material described in Example 2 in a first device using a lithium metal counterelectrode as far as 1.5 V vs Li+/Li, then a reoxidation as far as 2.25 V vs Li+/Li, the polyviologen electrode is recovered then assembled in a glovebox using as counterelectrode dilithium 2,5-dianilinoterephthalate and the electrolyte, LiClO$_4$ (1M) in propylene carbonate (PC).

The electrochemical tests are carried out by galvanostatic cycling with a C/10 regime.

The voltage limits were fixed at [0.2 V; 1.2 V].

Figure 4:
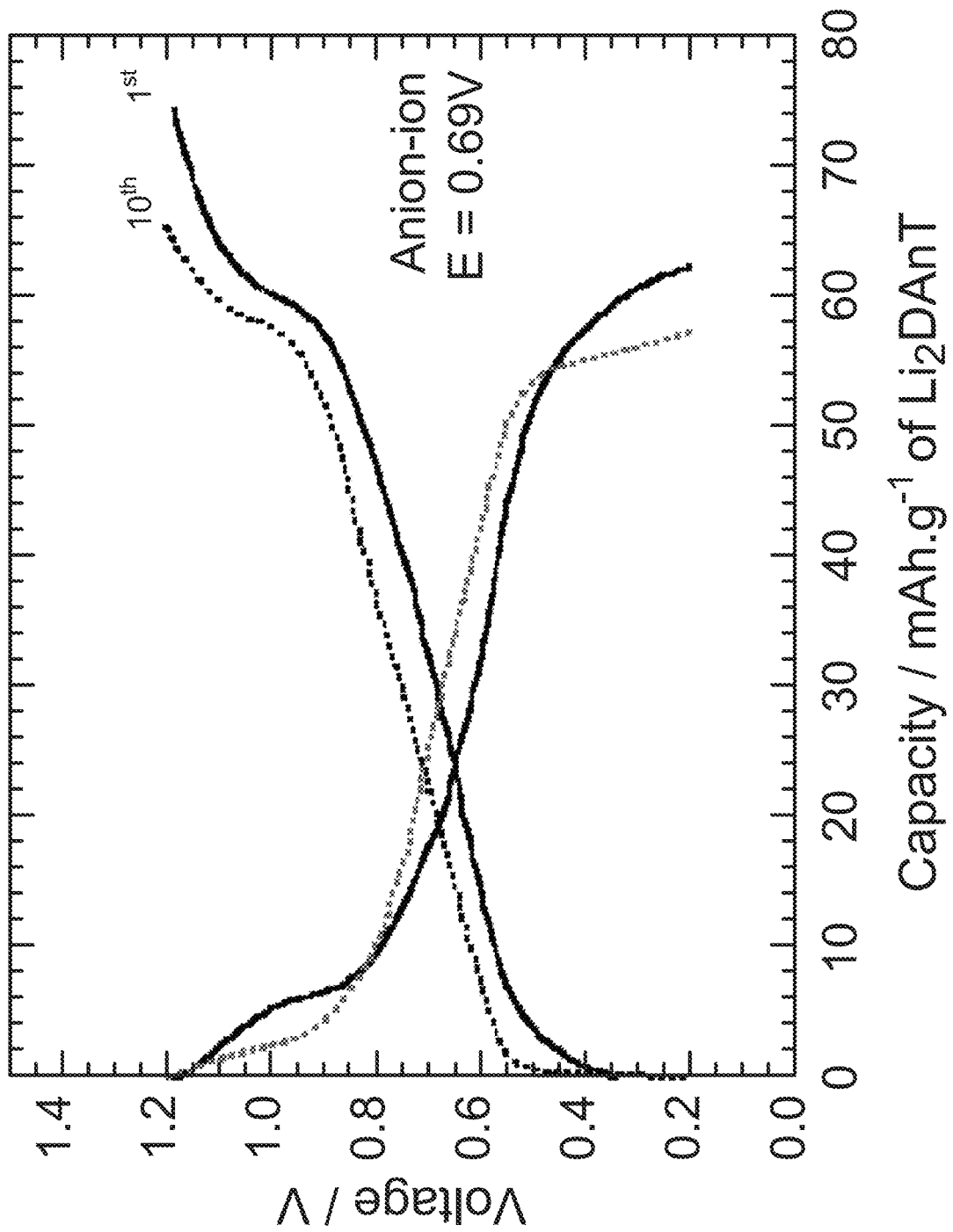
FIG. 4 illustrates the potential-capacity profiles of the first and tenth cycle for the battery obtained in Example 6.

As illustrated in FIG. 4, the performance qualities of this anionic "rocking-chair" battery, that is to say the battery in which it is the anion which shuttles between the two electrodes to counterbalance the charge during the charge/discharge cycles, are effectively confirmed.

The invention claimed is:

1. A method for using a battery which has an electrode that operates according to a mechanism of complexation of anions and which comprises an electrode active material, wherein the electrode active material is a polyviologen, and wherein said battery comprises an electrolyte in which said polyviologen is a material that is insoluble, comprising:
    using said battery at electrochemical conditions which are adjusted so that a charge/discharge cycle process is established on the basis of a 1-electron redox reaction between a 1-electron oxidized form of viologen units of said polyviologen, termed cation radical form, and a totally reduced form, termed neutral form,
    wherein the electrochemical conditions are adjusted so that a two-electron oxidized form of the viologen units of the polyviologen material does not participate in a charge/discharge cycle,
    wherein the polyviologen, in the 1-electron oxidized form or a two-electron oxidized form, has, as counterion(s), an organic anion selected from [N(SO$_2$CF$_3$)$_2$]$^-$ (=TFSI$^-$), [N(SO$_2$F)$_2$]$^-$ (=FSI$^-$), 4,5-dicyano-2-(trifluoromethyl)imidazole (=TDI), RCOO$^-$ and HCOO$^-$, and an inorganic anion, and
    wherein the electrode active material is formed of monomers comprising at least one neutral viologen unit of general formula (Ia) or one oxidized viologen unit of general formula (Ib) or (Ic)

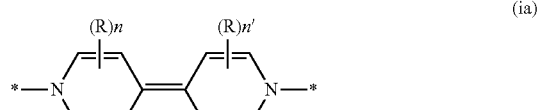

(Ia)

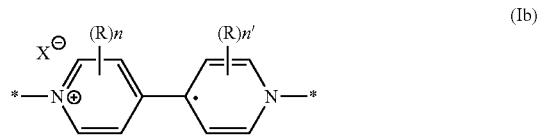

(Ib)

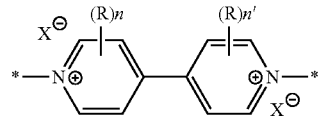

(Ic)

in which:
    the R groups, which may be identical or different, represent a hydrogen atom or represent a C$_2$ to C$_{50}$ linear alkyl, optionally substituted with at least one carboxylic, carboxylate, sulfonic, sulfonate, phosphonic, phosphonate or amine functional group, optionally substituted with at least one halogen atom, optionally substituted with at least one hydroxyl or aldehyde group, and/or optionally interrupted with a ketone unit;
    n and n' are, independently of one another, equal to 0 or to an integer between 1 and 50, and
    the X radicals, which may be identical or different, are respectively an organic anion selected from [N(SO$_2$CF$_3$)$_2$]$^-$ (=TFSI$^-$), [N(SO$_2$F)$_2$]$^-$ (=FSI$^-$), 4,5-dicyano-2-(trifluoromethyl)imidazole (=TDI), RCOO$^-$ and HCOO$^-$, or an inorganic anion.

2. The method according to claim 1, in which the charge/discharge cycle process is initiated with the polyviologen in neutral form or in cation radical form.

3. The method according to claim 2, in which the neutral form or the cation radical form of polyviologen is generated beforehand in situ from a polyviologen of which the viologen units are in a two-electron oxidized form, by partial or total reduction of its viologen units.

4. The method according to claim 1, in which the polyviologen is a linear or crosslinked polyviologen or a mixture thereof.

5. The method according to claim 1, wherein the electrode active material is of formula (II)

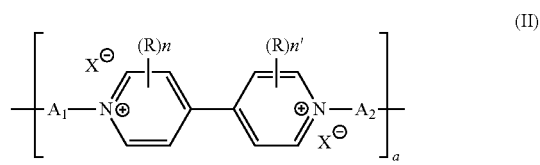

(II)

in its oxidized or reduced forms wherein
    the units A1 and A2, which may be identical or different, independently of one another represent a covalent bond or represent a C$_1$ to C$_{50}$ alkyl chain, optionally substituted with at least one carboxylic, carboxylate, sulfonic, sulfonate, phosphonic, phosphonate or amine functional group, optionally substituted with at least one halogen atom, optionally substituted with at least one hydroxy or aldehyde group, and/or optionally interrupted with a ketone radical or a unit of formula —Ar(A$_3$)-

Ar being a trivalent or tetravalent C$_6$ to C$_{10}$ arylene unit, and A$_3$ a C$_1$ to C$_{20}$ alkyl chain covalently bonded to the Ar unit and to a viologen unit derivative of formula (II), and
    the R groups, which may be identical or different, represent a hydrogen atom or represent a C$_2$ to C$_{50}$ linear alkyl, optionally substituted with at least one carboxylic, carboxylate, sulfonic, sulfonate, phosphonic, phosphonate or amine functional group, optionally substituted with at least one halogen atom, optionally substituted with at least one hydroxyl or aldehyde group, and/or optionally interrupted with a ketone unit;

n and n' are, independently of one another, equal to 0 or to an integer between 1 and 50, and the X radicals, which may be identical or different, are respectively an organic anion selected from [N(SO$_2$CF$_3$)$_2$]$^-$ (=TFSI$^-$), [N(SO$_2$F)$_2$]$^-$ (=FSI$^-$), 4,5-dicyano-2-(trifluoromethyl)imidazole (=TDI), RCOO$^-$ and HCOO$^-$, or an inorganic anion, and a is an integer ranging from 1 to 10 million.

6. The method according to claim 1, wherein, the electrode active material, is of general formula (III)

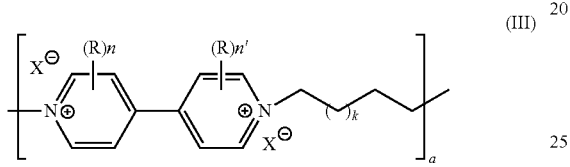

(III)

in its oxidized or reduced forms with the R groups, which may be identical or different, represent a hydrogen atom or represent a $C_2$ to $C_{50}$ linear alkyl, optionally substituted with at least one carboxylic, carboxylate, sulfonic, sulfonate, phosphonic, phosphonate or amine functional group, optionally substituted with at least one halogen atom, optionally substituted with at least one hydroxyl or aldehyde group, and/or optionally interrupted with a ketone unit;

n and n' are, independently of one another, equal to 0 or to an integer between 1 and 50, and the X radicals, which may be identical or different, are respectively an organic anion selected from [N(SO$_2$CF$_3$)$_2$]$^-$ (=TFSI$^-$), [N(SO$_2$F)$_2$]$^-$ (=FSI$^-$), 4,5-dicyano-2-(trifluoromethyl)imidazole (=TDI), RCOO$^-$ and HCOO$^-$, or an inorganic anion; and a is an integer ranging from 1 to 10 million and k is an integer ranging from 1 to 50.

7. The method according to claim 1, wherein the electrode active material is of general formula (IV)

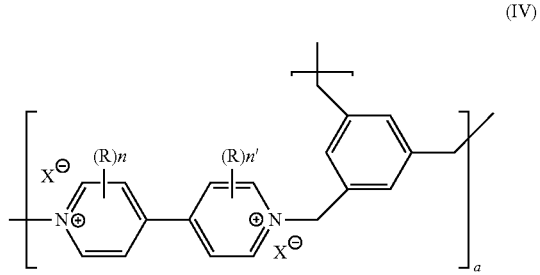

(IV)

in its oxidized or reduced forms with the R groups, which may be identical or different, represent a hydrogen atom or represent a $C_2$ to $C_{50}$ linear alkyl, optionally substituted with at least one carboxylic, carboxylate, sulfonic, sulfonate, phosphonic, phosphonate or amine functional group, optionally substituted with at least one halogen atom, optionally substituted with at least one hydroxyl or aldehyde group, and/or optionally interrupted with a ketone unit;

n and n' are, independently of one another, equal to 0 or to an integer between 1 and 50, and the X radicals, which may be identical or different, are respectively an organic anion selected from [N(SO$_2$CF$_3$)$_2$]$^-$ (=TFSI$^-$), [N(SO$_2$F)$_2$]$^-$ (=FSI$^-$), 4,5-dicyano-2-(trifluoromethyl)imidazole (=TDI), RCOO$^-$ and HCOO$^-$, or an inorganic anion; and a is an integer ranging from 1 to 10 million.

8. The method according to claim 1, in which said battery comprises, as a counterelectrode, a lithium metal electrode and its electrochemical conditions for use for its charge/discharge cycle process are obtained for a voltage between 1.5 V and 2.25 V vs Li$^+$/Li.

9. The method according to claim 1, in which said battery comprises, as a counterelectrode, dilithium 2,5-dianilino-terephthalate and its electrochemical conditions for use for its charge/discharge cycle process are obtained for a voltage of between 0.2 V and 1.2 V.

10. The method according to claim 1, in which said battery is a lithium or sodium battery, a sodium-sulfur battery, or a dual-ion or anion-ion battery.

* * * * *